United States Patent
Sun et al.

(10) Patent No.: US 12,003,542 B2
(45) Date of Patent: Jun. 4, 2024

(54) RAPID INITIAL DEPLOYMENT DATABASE SECURITY MODEL

(71) Applicant: International Business Machines Corporation, Armonk, NY (US)

(72) Inventors: Sheng Yan Sun, Beijing (CN); Shuo Li, Beijing (CN); Xiaobo Wang, Beijing (CN); Jun Wang, Groton, MA (US); Hua Wang, Newton, MA (US); Shidong Shan, Shirley, MA (US); Xing Xing Jing, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 210 days.

(21) Appl. No.: 17/148,684

(22) Filed: Jan. 14, 2021

(65) Prior Publication Data

US 2022/0224722 A1    Jul. 14, 2022

(51) Int. Cl.
*H04L 9/40* (2022.01)
*G06F 18/22* (2023.01)
(Continued)

(52) U.S. Cl.
CPC ............ *H04L 63/20* (2013.01); *G06F 18/22* (2023.01); *G06F 18/24143* (2023.01); *G06N 20/00* (2019.01); *H04L 63/102* (2013.01)

(58) Field of Classification Search
CPC .... G06K 9/6215; G06K 9/6274; G06N 20/00; H04L 63/102; H04L 63/20
See application file for complete search history.

(56) References Cited

U.S. PATENT DOCUMENTS 9,871,822 B2     1/2018  Nagaratnam et al.
10,841,325 B2 *  11/2020 Weingarten ......... H04L 63/1441
(Continued)

FOREIGN PATENT DOCUMENTS

CN    110517097 A  * 11/2019 ......... G06Q 30/0225
JP    2019511030 A    4/2019

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

*Primary Examiner* — Matthew Smithers
*Assistant Examiner* — Shu Chun Gao
(74) *Attorney, Agent, or Firm* — Matthew Zehrer

(57) ABSTRACT

A method, system, and computer program product for recommending an initial database security model. The method may include identifying a plurality of nodes connected to a security network. The method may also include analyzing security characteristics of each node of the plurality of nodes. The method may also include identifying, from the security characteristics, key factors for each node. The method may also include calculating similarities between each node of the plurality of nodes. The method may also include building a self-organized centerless network across the plurality of nodes by grouping nodes with high similarities based on the similarities between each node, where the self-organized centerless network is a centerless network without a central management server, and includes groups of nodes from the plurality of nodes. The method may also include generating federated security models for the groups of nodes.

20 Claims, 9 Drawing Sheets

(51) Int. Cl.
    *G06F 18/2413*     (2023.01)
    *G06N 20/00*     (2019.01)

(56) References Cited

U.S. PATENT DOCUMENTS

| | | | |
|---|---|---|---|
| 2003/0188019 A1* | 10/2003 | Wesley | H04L 67/1051 |
| | | | 709/245 |
| 2005/0086300 A1* | 4/2005 | Yeager | H04L 69/329 |
| | | | 709/204 |
| 2017/0324765 A1* | 11/2017 | McLaughlin | H04L 63/1441 |
| 2019/0171438 A1 | 6/2019 | Franchitti | |
| 2019/0265971 A1 | 8/2019 | Behzadi et al. | |
| 2021/0064591 A1* | 3/2021 | Sun | G06F 16/182 |

\* cited by examiner

RAPID INITIAL DEPLOYMENT DATABASE SECURITY MODEL

BACKGROUND

The present disclosure relates to database security models and, more specifically, to recommending an initial database security model for deployment on a database node.

Database security includes the various measures and implementations that help protect the database and its systems (e.g., database management systems (DBMS), servers, networks, applications, etc.) as well as the data stored within the database. Databases are often accessible by multiple computer systems and may also store data for multiple computer systems. Therefore, any breach to database security may not only affect the database itself but also all of the computer systems that have access to and/or store data on the database. Breaches to database security may include hacking and unauthorized access to the database, malicious software (i.e., malware) such as bots, bugs, worms, viruses, etc., and other unauthorized access and/or vulnerabilities of the database.

SUMMARY

The present invention provides a computer-implemented method, system, and computer program product to recommend an initial database security model to be deployed on a database node. The method may include identifying a plurality of nodes connected to a security network. The method may also include analyzing security characteristics of each node of the plurality of nodes. The method may also include identifying, from the security characteristics, key factors for each node. The method may also include calculating similarities between each node of the plurality of nodes. The method may also include building a self-organized centerless network across the plurality of nodes by grouping nodes with high similarities based on the similarities between each node, where the self-organized centerless network is a centerless network without a central management server, and where the self-organized centerless network includes groups of nodes from the plurality of nodes. The method may also include generating federated security models for the groups of nodes, where each federated security model includes an architectural model. The system and computer program product may include similar steps.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
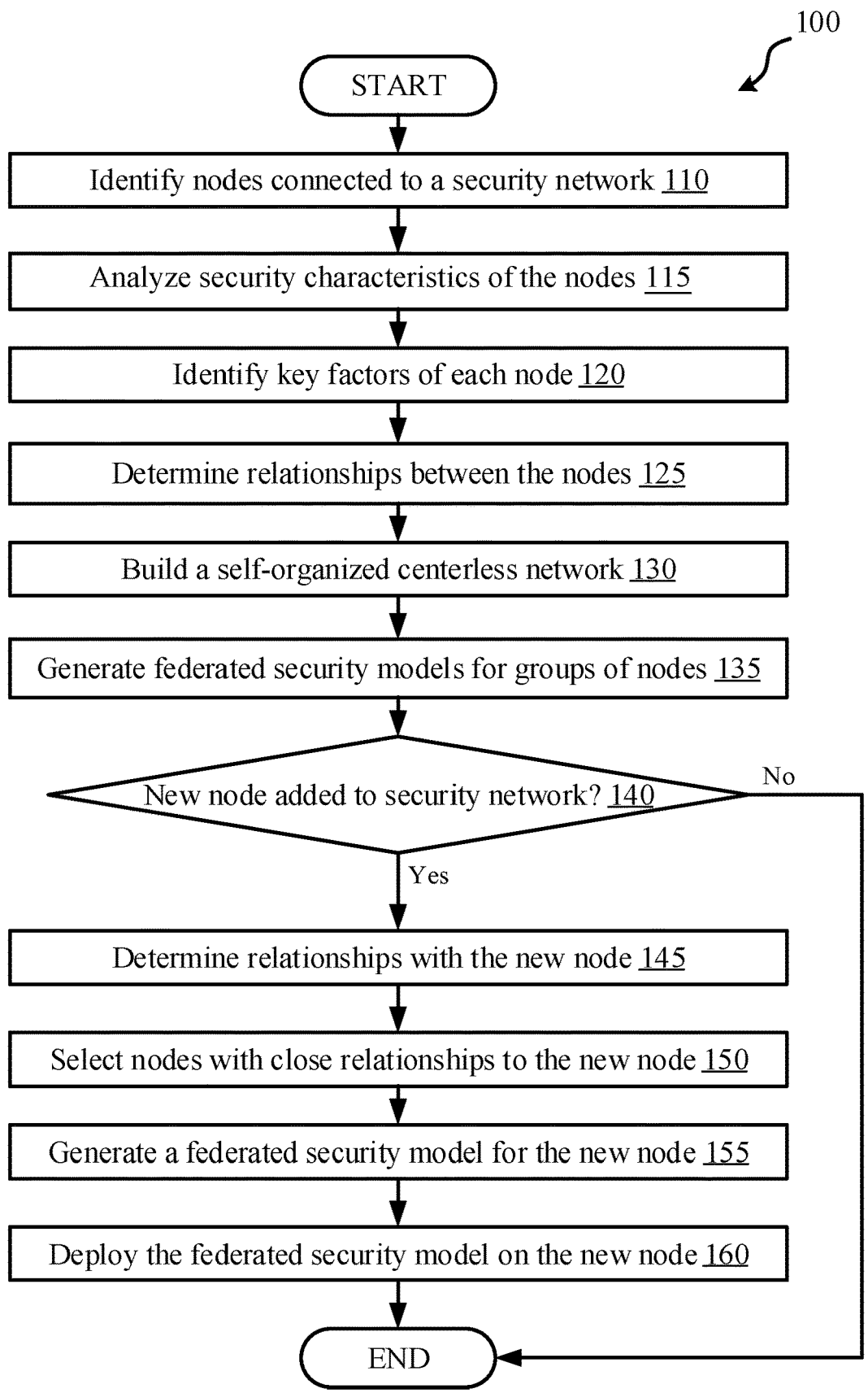
FIG. 1 depicts a flowchart of a set of operations for recommending and deploying an initial database security model on a database node, according to some embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to database security models and, more specifically, to recommending an initial database security model for deployment on a database node. While the present disclosure is not necessarily limited to such applications, various aspects of the disclosure may be appreciated through a discussion of various examples using this context.

With the increase in hybrid database usage and data centers being implemented on cloud, cloud databases and cloud security have become increasingly popular. A cloud database may be a database that is accessible through a cloud platform. The cloud database may have the same/similar functionality to a conventional database and may included the added capabilities and flexibilities offered through cloud computing. For instance, the cloud database may be accessed through software-as-a-service (SaaS) or database-as-a-service (DBaaS) which may allow for easier access to the database (for example, over a network). Cloud security may protect the data and databases through cloud computing.

As discussed herein, databases are often accessible by multiple computer systems and therefore any breach to database security may affect the database itself as well as any computer systems with access to the database. Cloud databases may be even more accessible due to their cloud computing nature (for example, as they may be accessed over a network). Because the cloud databases may be particularly accessible, it may be increasingly important to quickly and efficiently obtain database security for the cloud databases. In some instances, various client computer systems may have database security models (for example, database security architectures) and/or database security systems to protect their data stored on cloud database systems. However, the database security model may need to meet the specific requirements of the cloud database system so that it is compatible. In conventional computer systems, generating and deploying the database security models may take time, as the security model may need to meet the requirements of the cloud database system, which may increase the vulnerability of the cloud database and the data stored on the database, particularly during the time that the database security model is being created and before it has been deployed.

The present disclosure provides a computer-implemented method, system, and computer program product for efficiently recommending an initial database security model to be deployed on a database node. The database security model may be an architecture model. For example, the database security model may include suggested layers and, in some instances, components of each layer for a multi-layered security architecture. The cloud database system (with the cloud database) may be connected to various nodes that utilize the could database system. Nodes, as referred to herein, may be computer systems, computer devices, etc. that are using and/or connected to a cloud database system.

In some instances, each node may have its own database security systems to help protect themselves and its data (for example, stored on the cloud database system) from any vulnerabilities through the cloud database system. These database security systems may need to meet the specific requirements of the cloud database system. In some instances, nodes may install a security server as a layer of protection between themselves and the cloud database system. However, the full security server may have a significant amount of components and may use a large amount of resources (e.g., processing power, bandwidth, etc.) to install the full security server. Further, installing the full security server may take a longer amount of time because of the size of the security server. In some instances, each node may not need a full security server in order to protect themselves from vulnerabilities through the cloud database system. Additionally, each node may prefer a smaller security model be installed initially, as the smaller initial model may be much quicker and more efficient to install and may use fewer system resources, and then the system may tailor and/or add to the initial model after it has been installed.

To recommend an initial database security model, existing nodes connected to the cloud database system may be used. The nodes may be grouped together based on their relationships and similarities, forming a self-organized centerless network of nodes. The various security models (for example, the architectures of the various database security systems) may be used to form a single federated security model for each group of nodes. If there are any nodes in the group of nodes that do not have a database security system or if a new node is added to the group of nodes, the federated security model may be used as the initial database security model. The federated security model, or the initial database security model, may be based on only the nodes most similar to the new node, which may tailor the model to the new node. This may prevent the new node from installing a full security server and/or a full database security system with excess components that are not necessary for the specific node, and may result in an initial database security model with shorter initialization and deployment times, and that may use fewer resources to install. Additionally, because the initial model is formed from models for other nodes that have already been determined to meet any specific requirements of the cloud database system, the initial model may also meet any specific requirements of the cloud database system, which may prevent any flagging, blocking, removal, etc. of the initial database security model.

Referring now to FIG. 1, a flowchart illustrating a method 100 for recommending and deploying an initial database security model on a database node is depicted, according to some embodiments. In some embodiments, method 100 is executed by a server (e.g., computer system/server 702 (FIG. 7)) on or connected to a computer system (e.g., computer system 700 (FIG. 7)). In some embodiments, the method 100 is implemented as a computer script or computer program (e.g., computer executable code) to be executed on or connected to the computer system. In some embodiments, method 100 is executed on a computer system within a cloud computing environment (e.g., cloud computing environment 50 (FIG. 8)).

Method 100 includes operation 110 to identify nodes connected to a security network. As discussed herein, one or more nodes (e.g., computer systems, computer devices, etc.) may utilize a cloud database system with a cloud database. The nodes may access the cloud database through a network. This network may be referred to herein as a security network. In some embodiments, identifying nodes connected to a security network includes finding the nodes that have access to the cloud database. In some instances, a plurality of nodes are connected to a security network and have access to the cloud database.

Method 100 includes operation 115 to analyze security characteristics of each node connected to the security network. When a node connects to the security network (for example, when a node gains access to the cloud database), the cloud database system may receive access to data regarding existing security policies and/or security server layers of the node. In some instances, the node, or the client of the node, must give permission before any access is granted. The data regarding related security policies and/or security server layers may include data about policy definitions, policy sizes, transform definition fields, etc. This data may be referred to as security characteristics of the node. For example, the security characteristics may include data regarding tokens, application authorization, application methods, various protocols, database types, connection internet protocol addresses (IP addresses), connection methods, user authorization requirements, role authorization requirements, structured query language (SQL) data (e.g., data definition language (DDL), data query language (DQL), data control language (DCL), data manipulation language (DML), etc.), security maintenance methods, database objects/fields/verbs, predicate values, database catalogs, network connections, local or remote access, cluster sizes, traffic within the node, etc. As discussed herein, each node may need to authorize access to the various security characteristics before any access to these characteristics is granted.

Method 100 includes operation 120 to identify key factors for each node based on the security characteristics. The key factors are factors from the security characteristics that may have a significant impact on the security model or architectural model for the node. In some instances, the key factors are a predetermined set of factors. For instance, the key factors may be the data Inputs/Outputs (I/O), the central processing units (CPUs) used, the response time, the return size, the security policy size, the statement size, and the security object size. In this instance, identifying the key factors for a node may include identifying the data I/O, the CPUs used, the response time, the return size, the security policy size, the statement size, and the security object size from the security characteristics.

In some embodiments, there may be additional factors that are not on the list of the predetermined set of key factors (and are not on a list of a predetermined set of factors that are not key factors). In these instances, the additional factors may be treated as key factors. In some instances, only the factors that are part of the predetermined set of key factors may be treated as key factors.

Method 100 includes operation 125 to calculate similarities between each node connected to the security network. In some embodiments, calculating similarities between each node includes comparing each node connected to the security network. In some embodiments, a vector relationship equation may be used to calculate the relationships, or similarities, between each node. When the relationships between nodes are calculated using a vector relationship equation, each node may need to undergo vectorization in order to be converted into a vector format. In some instances, the vectorization may occur through factor data vectorization using the key factors. In some instances, machine learning algorithms (for example, conventional machine learning vectorization algorithms, machine learning vectorization algorithms built and trained by the cloud database system, etc.) are used to perform vectorization on the node. For instance, the key factors of the node may be inputted in the machine learning vectorization algorithm and the algorithm may output parameter values for the vector for the node.

Figure 4:
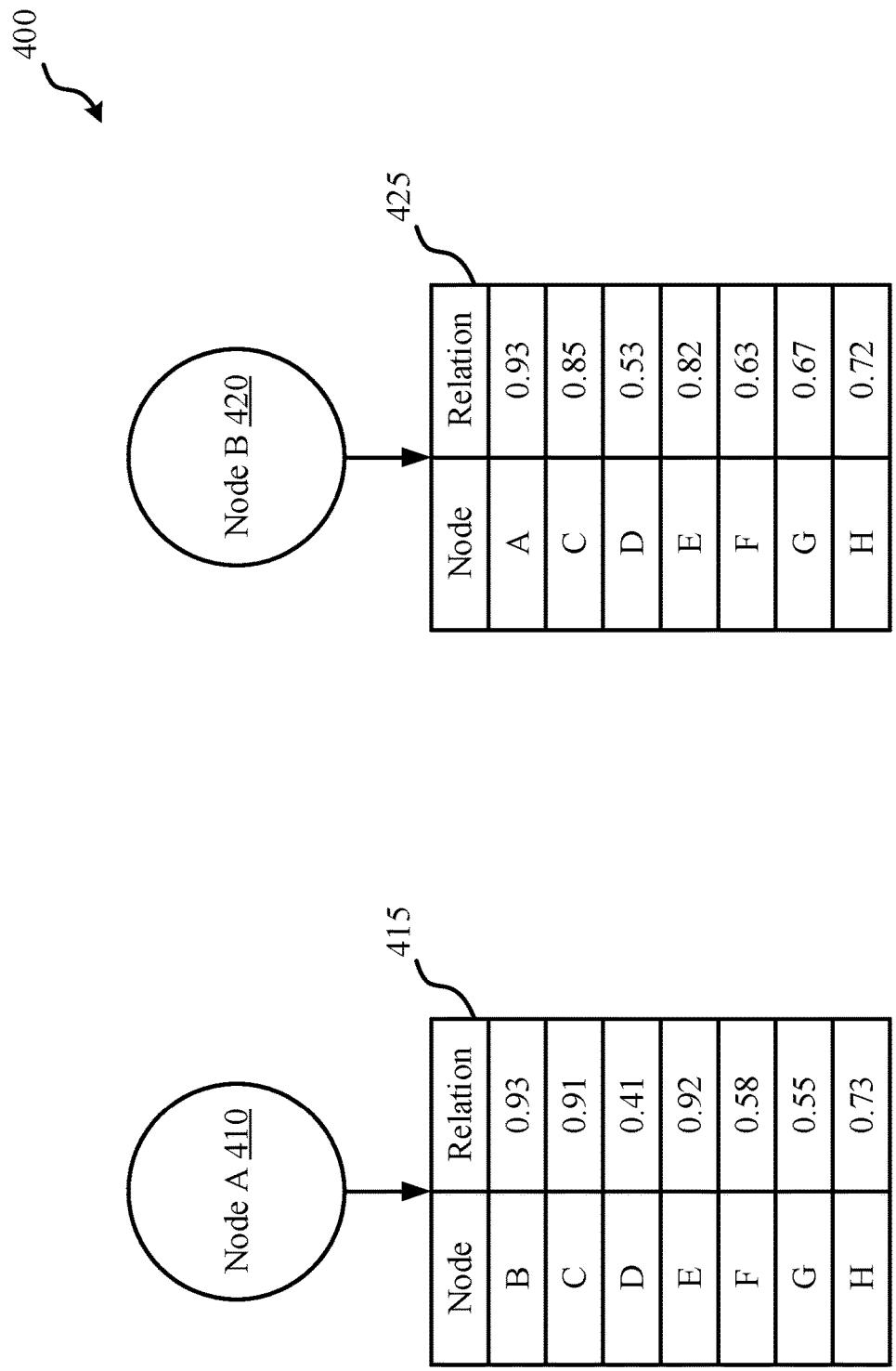
FIG. 4 depicts a schematic diagram of an example node relationship map, according to some embodiments.

In some embodiments, once each node is vectorized (i.e., put into vector format), the vector relationship equation may be used to calculate the relationships, or similarities, between the nodes. The vector relationship equation may calculate the vector distance between each vector. In some embodiments, the vectors with the smallest vector distance between them have the closest relationships, or the most similarities, and the vectors with the largest vector distance between them have the least close relationships, or the least similarities. The vector distance, and the relationships between each vector, may be represented by a percent, a decimal, an integer, a category (e.g., very high relation, high relation, good relation, moderate relation, etc.), etc. FIG. 4 depicts and example of a decimal representation of the relationships between the vectors.

Figure 3:
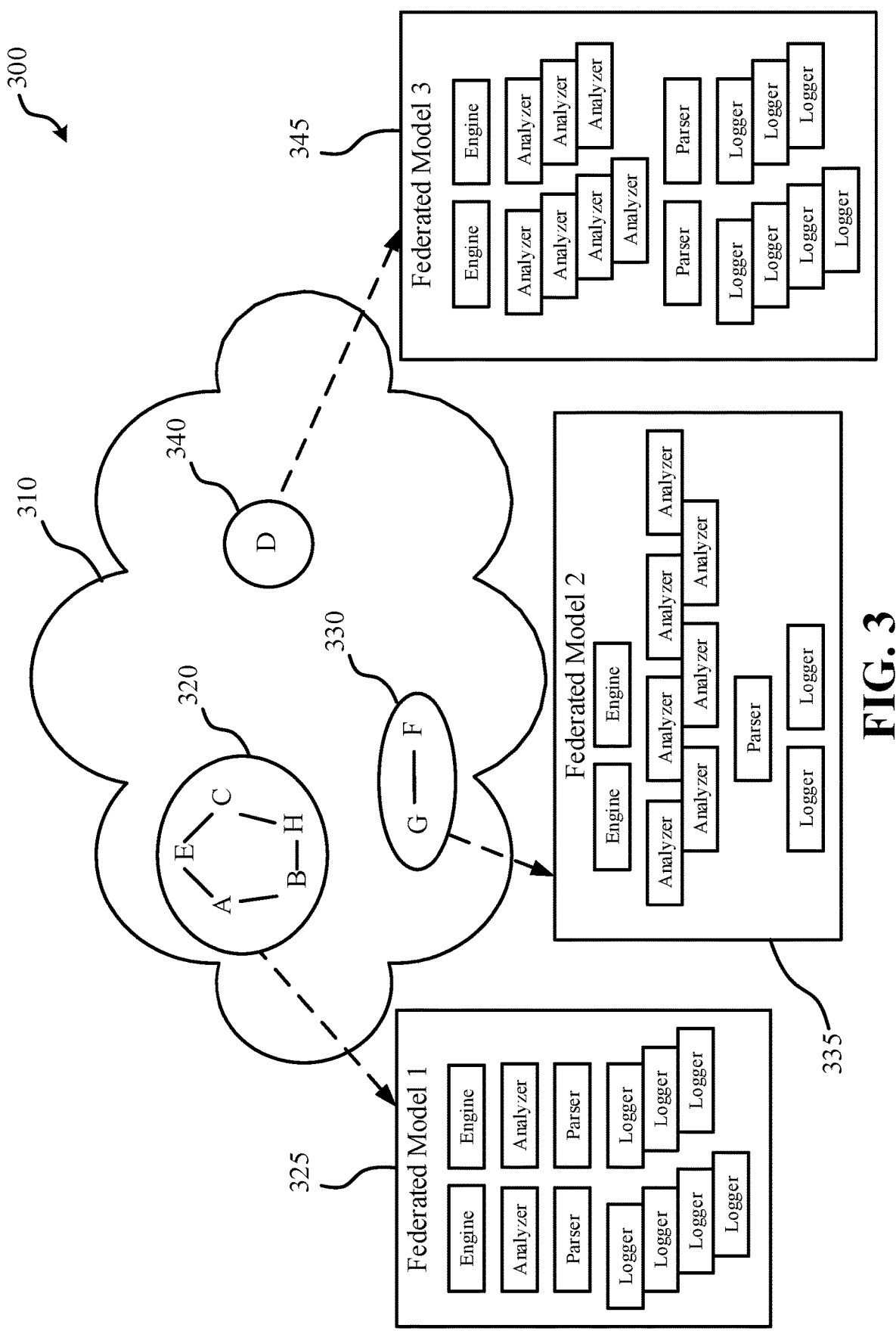
FIG. 3 depicts a schematic diagram of an example self-organized centerless network, according to some embodiments.

Method 100 includes operation 130 to build a self-organized centerless network across the nodes based on the key factors and the similarities, or relationships, between each node. The self-organized centerless network may include one or more groups of nodes. The nodes in each group of nodes may have a strong relationship, or high similarity, between each node in the group of nodes, in some instances. In some instances, a group of nodes may include nodes that have a strong relationship to one of the nodes. For example, a group of nodes may include nodes A, B, C, and D, with nodes B, C, and D having relationships/similarities of 95%, 92% and 91%, respectively, to node A. In this example, nodes B and D may only have an 81% relationship to each other, however because of their strong relationships to node A, they may still be grouped together. In some embodiments, the self-organized centerless network is an arrangement (e.g., groupings) of nodes that are connected to the security network without a central management server. In conventional database security, there may be a central management server for all the nodes. The self-organized centerless network may not include any sort of central management server. FIG. 3 depicts an example self-organized centerless network 310.

In some embodiments, as there is no central management server and the network is self-organized, the organization, or groupings, may not be consistent for each node in the centerless network. For example, node A may have a self-organized centerless network with nodes A, B, C, D, and E all grouped together, but node B may have a self-organized centerless network with nodes B, C, D, E, and F grouped together, with node A not a part of the group. For instance, node B may have nodes C, D, E, and F with a 90% relationship or higher to node B, and node A may only have an 85% relationship to node B, so it may be excluded from the group. But, for node A's grouping of nodes, only nodes C and D may have a relationship with node A of over 90%, and nodes B and E may have relationships of 85% and 82%, respectively. Because there are fewer nodes, in this example, with a very close relationship to node A (for example, above 90%), nodes with a slightly less close relationship (for example, above 80%) may be included in the grouping for node A.

In some embodiments, building the self-organized centerless network includes generating a node relationship map for the plurality of nodes connected to the security network. As discussed herein, the nodes may undergo vectorization and the distances between each node vector may be calculated in order to determine the relationship between each node that is connected to the security network (for example, because they are using the cloud database). The node relationship map may map the various relationships between the nodes. In some embodiments, the node relationship map may include one or more tables (for example, as depicted in FIG. 4 and FIG. 5*b*). In some embodiments, the node relationship map may include a vector representation of the relationships between the nodes. For example, longer vectors may indicate a strong relationship between nodes (or vice versa).

In some embodiments, the node relationship map may include node relationship maps for each node. For example, nodes A, B, C, D, E, and F may be connected to the security network and may be using the cloud database, and each node (A, B, C, D, E, and F) may have their own node relationship map that indicates that specific node's relationships with each of the other nodes. For instance, there may be a table of nodes B, C, D, E, and F's relationships to node A. In some embodiments, there may be a single node relationship map for all the nodes. For example, the relationship between nodes A and B may be represented by a vector, the relationship between nodes A and C may be represented by a vector, the relationship between nodes B and C may be represented by a vector, and so on until there is a vector for each relationship between each node.

In some embodiments, building the self-organized centerless network includes grouping the nodes (connected to the security network) based on the node relationship map. Grouping the nodes may result in one or more groups of nodes. In some embodiments, the nodes may be grouped together based on their overall relationships to each other. In some embodiments, one node may be selected and the nodes may be grouped together based on their overall relationships to that node. In some embodiments, the nodes may be grouped together based on their relationships to specific nodes and the overall relationships.

For example, node A may have the closest relationships to nodes B, D, and E, node B may have the closest relationships to nodes A, C, and D, node C may have the closest relationships to nodes B and D, node D may have the closest relationships to nodes B and C, and nodes E and F may have the closest relationships with each other. In this example, the highest overall relationships may be between nodes E and F, nodes A and B, and nodes B and C. If the nodes are grouped based on their overall relationships to each other, nodes E and F may be in one group, nodes A, B, and C may be in another group, and node D may be on its own. If the nodes are grouped together, in this example, based on their relationships to one node (e.g., node A), nodes A, B, D, and E may be in a group together and nodes C and F may be by themselves. If the nodes are grouped together based on both the relationship to specific nodes and also their overall relationships, nodes A, B, C, and D may be in one group (for example, because the relationships between nodes B and C, C and D, and B and D may be stronger than the relationship between nodes A and E) and nodes E and F may be in another group (for example, because the relationship between nodes E and F may be stronger than the relationship between nodes A and E).

In some embodiments, grouping the nodes includes generating a closest neighbors list for each node using the node relationship map. A closest neighbors list may be a list of nodes with the strongest relationship to the node. Using the above example, the closest neighbors list for node A may be nodes B, D, and E; the closest neighbors list for node B may be nodes A, C, and D; the closest neighbors list for node C may be nodes B and D; and so on.

Grouping the nodes may also include determining a relationship threshold based on the node relationship map and the closest neighbors list. The relationship threshold may be a threshold relationship value indicating that nodes with relationships below the threshold do not have a close enough relationship to be grouped together. In some embodiments, the relationship threshold may be a predetermined value (for example, the relationship threshold may be a 0.75, or 75%, relation to each other). In some embodiments, the relationship threshold is determined based on the relationship map and the closest neighbors list, and may change if the relationships between nodes change. For example, nodes A, B, C, D, and F all have a relationship values of 0.78 or higher (indicating that they all have 78% relation or higher to each other), and node E has less than 0.50 relation to any of the nodes. In this example, if the relationship threshold is 0.75, nodes A, B, C, D, and F may be grouped together and then node E may be on its own. However, in this example, node D may only be 0.75, 0.76, and 0.77 related to nodes A, B, and C respectively and may be 0.98 related to node F. Similarly node F may be 0.76, 0.77, and 0.78 related to nodes A, B, and C respectively, but again a 0.98 relation to node D. In this example, nodes A, B, and C may all have relationships of 0.93 or above with each other, but may only be 0.76-0.78 related to nodes D and F. In this example, based on the relationship values and the closest neighbors to each node, it may be beneficial to have a relationship threshold of 0.90. A relationship threshold of 0.90 may result in nodes A, B, and C in one group, nodes D and F in a second group, and node E by itself.

Grouping the nodes may also include comparing each node relationship to the relationship threshold and forming groups of nodes that include nodes with relationships above the relationship threshold. As discussed herein, each node relationship may be represented by a decimal, a percent, an integer, etc. The various node relationships may be a part of the node relationship map. To determine which nodes to group together, the nodes relationships may be compared to the relationship threshold to determine whether they are greater than or equal to the relationship threshold. For example, using the example above, only the node relationships that are equal to or above 0.90 may be grouped together. In another example, nodes A, B, and C may all have a node relationship of 0.95 or above with each other. However, in this example, node D may have a node relationship of 0.91 to node B, 0.90 to node C, and 0.85 to node A. Even though node D meets a relationship threshold of 0.90 with nodes B and C, node D may not, in some instances, be put in a group with nodes A, B, and C because it is below the relationship threshold with node A. In other instances, the relationship threshold may be 0.80 or above, which would allow for node D to be put in a group with nodes A, B, and C.

Method 100 includes operation 135 to generate federated security models for the groups of nodes. A federated security model may be a single security model for the group of nodes based on the security models for each node within the group of nodes. A security model may be a model (for example, an architectural model), or layout, of the various layers and/or components of database security (or at least cloud database security) for a node. Some example federated security models are depicted in FIG. 3 and discussed further herein.

In some instances, generating federated security models for the groups of nodes may include generating a federated security model for each group of nodes, so that each group of nodes has a federated security model. Generating the federated security model for a group of nodes may include identifying a machine learning security model for the security network. In some embodiments, the machine learning security model is a pre-existing machine learning model that can generate security models for the nodes. In some instances, the machine learning security model may have been built and trained using historical data from the various nodes connected to the security network.

In some embodiments, generating the federated security model for a group of nodes includes generating a node security model for each node in the group of nodes. As discussed herein, the node security model may include an architectural model of the database security (for example, the cloud database security) for the node. Generating the node security model may include selecting a node, from the group of nodes, for generating the security model. To generate the node security model, the key factors for the node may be inputted into the machine learning security model. Once the key factors for the node are inputted into the model, the machine learning security model may output an architectural model for the node. The architectural model outputted by the machine learning security model may include a deployment layer structure for the node. For instance, security models may include layers such as an engine layer corresponding to various hardware for the node, an analyzer layer corresponding to the analyzing of various data, inputs/outputs, security network traffic, etc. for the node and its communications with the cloud database, a parser layer for parsing through the data gathered from the analyzing, and a logger layer for logging the information found through the parsing. In some instances, the architectural model that is outputted by the machine learning security model may include quantities of logger layers, parser layers, analyzer layers, and engine layers for the node. For example, if the key factors of a node indicate that the node has a large security policy size, a large statement size, large security object size, a large amount of I/O, etc., then the architectural model for that node may include a larger amount of layers (e.g., 2 engine layers, 8 analyzer layers, 4 parser layers, and 8 analyzer layers) because of the key factors. In another example, if the key factors of a node indicate that the node has a small security policy size, a small statement size, etc. then the architectural model for the node may include 2 engine layers, 2 analyzer layers, 2 parser layers, and 6 logger layers based on the key factors.

In some embodiments, generating the federated security model for a group of nodes includes performing parameter averaging techniques on each node security model. The parameter averaging techniques may use parameters of each of the node security models to determine, or result in, a set of parameters for the group of nodes. The single set of parameters determined for the group of nodes (as a whole) may then be used to generate the federated security model for the group of nodes. Performing parameter averaging techniques may be discussed further herein and depicted in FIG. 6.

In some embodiments, generating the federated security model for a group of nodes includes generating the federated security model from the set of parameters. The set of parameters may be the set of parameters that are the best fit for the group of nodes as a whole. In some instances, the set of parameters are the parameters for the federated model. Therefore, the federated model may be formed from the set of parameters. As discussed herein, the federated security model may be a single model (for example, a best fit model) for the group of nodes. It may include a best fit architectural model, such as a layer configuration, for database security for the group of nodes. For example, while each node within a group of nodes may have security models that are not identical to the federated security model, the federated security model for the group of nodes may be an architectural model of two engine layers, seven analyzer layers, two parser layers, and two logger layers.

Method 100 includes operation 140 to determine whether there has been a new node added to the security network. If a new node has been added to the security network, the federated security models may be used to help generate an initial security model for the new node. If a new node has not been added to the security network (as determined in operation 140), method 100 may end.

If, in operation 140, it is determined that a new node has been added to the security network, method 100 proceeds to operation 145 to calculate similarities between the new node and each node connected to the security network. This may help determine which nodes should be grouped with the new node, and/or which group the new node should be placed in. Calculating similarities between the new node and each node connected to the security network may be done using a similar method to operation 125, discussed herein. The relationships between the new node and each of the existing nodes may be calculated using a vector relationship equation. Therefore, calculating similarities between the new node and each node connected to the security network may include performing vectorization on the new node, in order to obtain a vector format for the new node. In some instances, the vectorization may occur through factor data vectorization using the key factors of the new node. In some instances, machine learning algorithms (for example, conventional machine learning vectorization algorithms, machine learning vectorization algorithms built and trained by the cloud database system, etc.) are used to perform vectorization on the new node. For instance, the key factors of the new node may be inputted in the machine learning vectorization algorithm and the algorithm may output parameter values for the vector for the new node.

Once the new node is vectorized (i.e., put into vector format), a vector relationship equation (for example, calculating the vector distance between each vector) may be used to calculate the relationship between the new node and all the other nodes connected to the security network.

Method 100 includes operation 150 to select nodes with close relationships to the new node (referred to as selected nodes). As discussed herein, the vector distance between the nodes may correlate to the relationship between the nodes. For example, the vectors with the smallest vector distance between them may have the closest relationships. Therefore, selecting the nodes with close relationships to the new node may include selecting the node relationships (to the new node) with the smallest vector distances. In some instances, there may be a threshold number of nodes to select. For instance, there may be a threshold of five nodes, therefore the five nodes with the smallest vector distances between themselves and the new node may be selected in operation 150. In some embodiments, there may be a threshold vector distance, therefore any nodes with a vector distance between themselves and the new node that is less than or equal to the threshold vector distance may be selected.

Method 100 includes operation 155 to generate a federated security model for the new node based on the selected nodes. In some embodiments, generating the federated security model for the new node may include grouping the new node with other nodes connected to the security network based on the relationships between the new node and the other nodes. In some instances, the new node is grouped with the selected nodes from operation 150. Therefore, the nodes with the closest relationship to the new node may be grouped together with the new node. In some instances, the new node is added to an existing group of nodes (for example, formed in operations 130 and/or 135). For example, nodes A, B, C, D, E, and F may be connected to a security network, and node G may be added to the network. Nodes A, B, C may be grouped together, node D may be on its own, and nodes E and F may be grouped together. If the nodes with the closest relationship are grouped together with the new node, a new group may form with new node G and nodes A, D, and F, in this example, because nodes A, D, and F have a closest relationship to node G. In another example, node G may be added to the group with nodes E and F because the existing group with nodes E and F may have the closest relation to node G (compared to the single node D and the group of nodes A, B, and C).

In some embodiments, generating the federated security model for the new node may include identifying an existing federated security model (for example, as generated in operation 135) that corresponds to a highest amount of nodes with a close relationship to the new node (this may be referred to as a best match security model), and selecting the best match security model as the federated model for the new node. In some instances, when the new node is added to an existing group of nodes, the federated model for the existing group of nodes may become the federated model for the new node. In some instances, the federated model from the group of nodes with the most nodes that have the closest relationships to the new node becomes the federated model for the new node. For example, the self-organized centerless network may include a group with nodes A, B, and C, a group with nodes D and F, and node E may be on its own. A new node G may be added to the security network, and new node G may have the closest relationships to nodes B, D, F, and E. In this example, the group with nodes D and F may be the group of nodes with the most nodes that have a closest relationship to new node G, because both nodes in the group have a close relationship to node G. Therefore, in this example, the federated model for the group of nodes D and F may become the federated model for node G, and may be deployed on node G as an initial security model for the node.

In some embodiments, generating the federated security model for the new node may include analyzing the federated security models that correspond to the selected nodes (from operation 150) and synthesizing the federated security models that correspond to the selected nodes. In some instances, the nodes that are most similar to the new node may not all be from the same group of nodes (within the self-organized centerless network) and may not all correspond to the same federated security model. Therefore, in some instances, creating a new federated security model for the new node (as opposed to just identifying the best fit existing federated security model), may result in a more accurate federated security model for the new node. To create a new federated security model may include combining (or synthesizing) the various federated security models that correspond to the selected nodes into a single federated security model.

For instance, synthesizing the federated security models that correspond to the selected nodes may include identifying all parameters used in the federated security models, determining a set of parameters for the federated security model for the new node based on the parameters used in the federated security models, and generating the federated security model from the set of parameters. The federated security models may be analyzed in order to identify the parameters for each federated security model that corresponds to the selected nodes. For example, the self-organized centerless network may include a group with nodes A, B, and C, a group with nodes D and F, and node E may be on its own. A new node G may be added to the security network, and new node G may have the closest relationships to nodes B, C, D, and F. In this example, the federated model for the group A, B, and C and the federated model for group D and F may be analyzed to identify the parameters for each of the two federated models. In some instances, determining the set of parameters for the federated security model for the new node may include performing parameter averaging techniques on the federated security models that correspond to the selected nodes. Parameter averaging is further discussed herein and depicted in FIG. 6. The resulting parameters that are outputted from the parameter averaging techniques may be used as the parameters for the new federated security model for the new node.

In some embodiments, generating the federated security model for the new node may include generating the federated security model for a group of nodes including the new node and the selected nodes (from operation 150). The security models from each selected node may undergo parameter averaging techniques (for example, as discussed herein in relation to operation 135), and the federated security model may be generated based on the set of parameters from the parameter averaging technique.

Method 100 includes operation 160 to deploy the federated security model for the new node on the new node. The new node that was added to the security network (for example, because it gained access to the cloud database) may not have initially had database security related to the cloud database. To add database security to the new node quickly and efficiently, while still maintaining the accuracy of the database security, the federated security model for the new node may be deployed on the new node as initial database security for the new node. For example, the federated security model may include two engine layers, seven analyzer layers, one parser layer, and four logger layers. Therefore, deploying the federated security model on the new node, in this example, may include deploying two engine layers, seven analyzer layers, one parser layer, and four logger layers on the node.

In some instances, the new node is added to the self-organized centerless network. Adding the new node to the self-organized centerless network may include adjusting the groups to include the new node. In some instances, the new node may be added to an existing group of nodes. In some instances, when the new node is added to an existing group of nodes, a node that was part of the group of nodes may be removed from the group (for instance, because it has the least relation to the other nodes within the group) and either put on its own or added to a different group of nodes. In some instances, the new node may be paired with a single node in order to form a new group of nodes.

Figure 2:
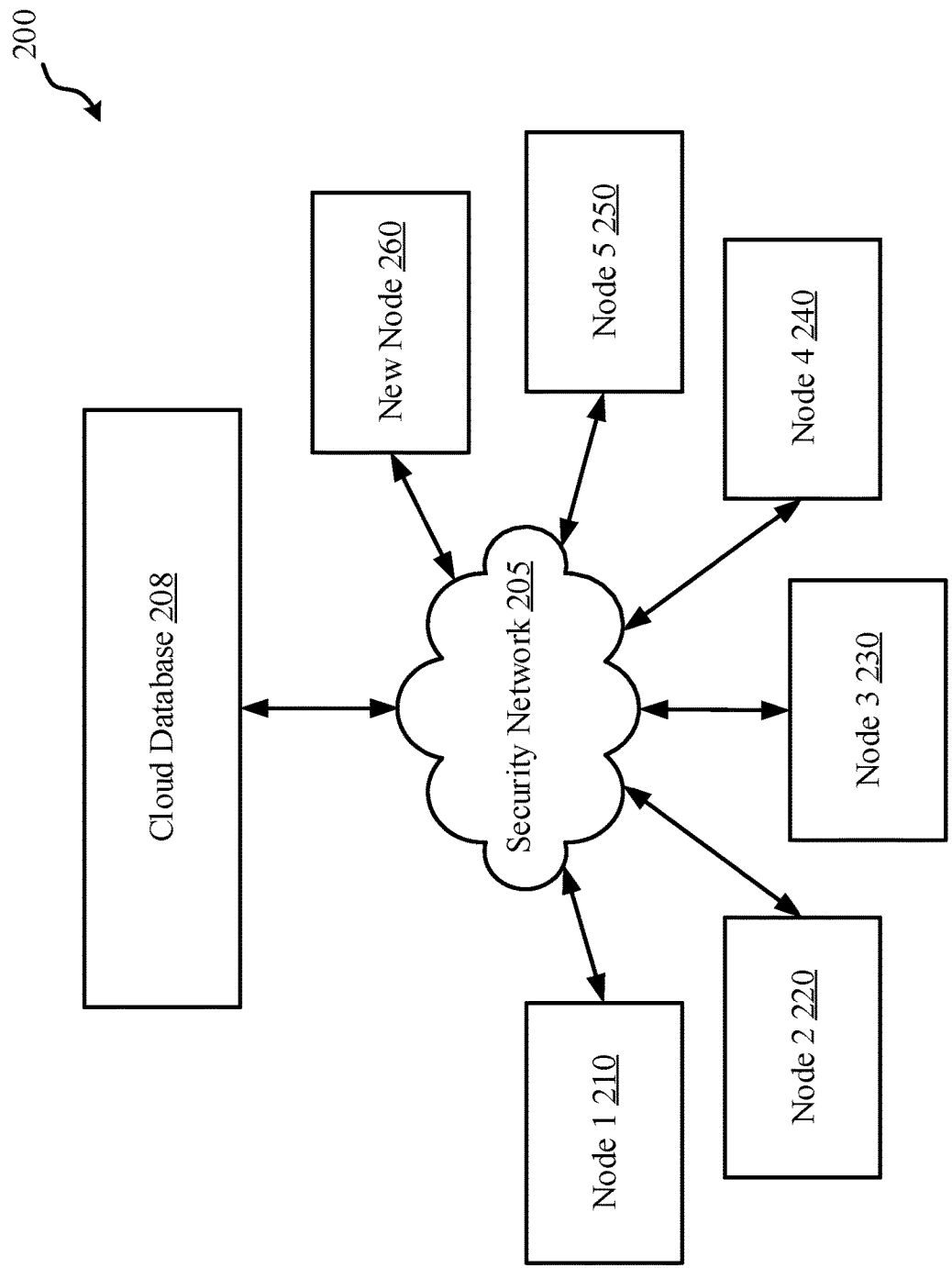
FIG. 2 depicts a schematic diagram of an example database security environment, according to some embodiments.

Referring to FIG. 2, a schematic diagram of an example database security environment 200 is depicted, according to some embodiments. The database security environment 200 may include a cloud database 208 and various nodes (e.g., node 1 210, node 2 220, node 3 230, node 4 240, and node 5 250) that use the cloud database 208. Node 1 210, node 2 220, node 3 230, node 4 240, and node 5 250 access the cloud database 208 through the security network 205. Additionally, as depicted in FIG. 2, a new node 260 was newly added to security network 205 to gain access to cloud database 208. New node 260 may not have any database security to protect their data in cloud database 208 and any security threats through cloud database 208 and security network 205. In some instances, method 100 may be used to quickly and efficiently deploy database security for new node 260 so that new node 260 is protected.

Referring to FIG. 3, a schematic diagram of an example self-organized centerless network environment 300 is depicted, according to some embodiments. The self-organized centerless network environment 300 may include self-organized centerless network 310. Self-organized centerless network 310 includes nodes A, B, C, D, E, F, G, and H. Nodes A, B, C, E, and H are in group 320, nodes G and F are in group 330, and node D is in an individual group 340. As discussed herein, self-organized centerless network may not include a central management server. In some instances, each group (groups 320, 330, and 340) within the self-organized centerless network includes its own federated model. Group 320 has a federated security model 1 325, group 330 has a federated security model 2 335, and group 340 has a federated security model 3 345. The federated security models (325, 335, and 345) may have been generated in, for example, operation 135 (FIG. 1). For self-organized centerless network 310, federated security model 1 325 (for group 320 with nodes A, B, C, E, and H) includes an architectural model with two engine layers, two analyzer layers, two parser layers, and seven logger layers. Nodes A, B, C, E, and H may be nodes with standard workloads, and their federated model (federated model 1 325) may be a more standard security model. Federated security model 2 335 (for group 330 with nodes G and F) includes an architectural model with two engine layers, seven analyzer layers, one parser layer, and two logger layers. Nodes G and F may perform more analyzing than a standard workload, so they may need more analyzer layers (i.e., seven) compared to the nodes in group 320 (which have two analyzer layers). Further, nodes G and F may not execute much parsing and logging compared to nodes A, B, C, E, and H and their federated security model 1 325, and therefore nodes G and F may not need as may parser and logger layers in their federated security model 2 335. Group 340 with node D has a federated security model 3 345 that includes an architectural model with two engine layers, seven analyzer layers, two parser layers, and seven logger layers. Node D may be a more complex node with higher workloads. For instance, node D may perform a similar amount of analyzing to nodes G and F, and much more analyzing than nodes A, B, C, E, and H. Additionally, node D may perform a similar amount of logging to nodes A, B, C, E, and H, and much more logging than nodes G and F. Therefore, node D may need a large amount of analyzer layers (in this instance, seven) and logger layers in its federated model 3 345.

Referring to FIG. 4, a schematic diagram of an example node relationship map 400 is depicted, according to some embodiments. In example node relationship map 400, each node may have its own map (for example, represented by a table, chart, etc.) of relationships to the other nodes. However, other node relationship maps may have a single representation of all the relationships between the nodes (for example, using vectors or other representations), may represent the relationships between the nodes using other representations, etc. Node relationship map 400 is just one example of a node relationship map, and other node relationship maps may represent the relationships between each node in other ways.

Node relationship map 400 includes node A 410 and node B 420. Node relationship map 400 only depicts node relationships, or node similarities, for node A 410 and node B 420, for simplicity sake, however nope relationship map 400 may additionally include node relationships for nodes C, D, E, F, G, and H. A node relationship map, such as node relationship map 400, may show the relationships between each node that is part of the node relationship. In node relationship map 400, chart 415 is used to depict the relationships between node A 410 and the rest of the nodes that are connected to the security network. Node A 410 has a 0.93 relation (or similarity) to node B, a 0.91 relation to node C, a 0.41 relation to node D, a 0.92 relation to node E, a 0.58 relation to node F, a 0.55 relation to node G, and a 0.73 relation to node H. In node relationship map 400, chart 425 is used to depict the relationships between node B and the rest of the nodes that are connected to the security network. Node B 420 has a 0.93 relation to node A, a 0.85 relation to node C, a 0.53 relation to node D, a 0.82 relation to node E, a 0.63 relation to node F, a 0.67 relation to node G, and a 0.72 relation to node H.

The nodes may be grouped together to form the self-organized centerless network based on relationship 400, in some instances. For example, the relationship threshold may be 0.85. Node A 410 has relations to nodes B, C, and E that are above the relationship threshold. Node B 420 has relations to nodes A and C that are above the relationship threshold. In some instances, when nodes are grouped together based on their relation, or similarity, to a single node, a group of nodes based on their relationship to node A 410 may include nodes A, B, C, and E, and a group of nodes based on their relationship to node B 420 may include nodes A, B, and C. In some instances, a group of nodes may include nodes A, B, and C because nodes A, B, and C all have relations to each other that are above the relationship threshold of 0.85.

Figure 5A:
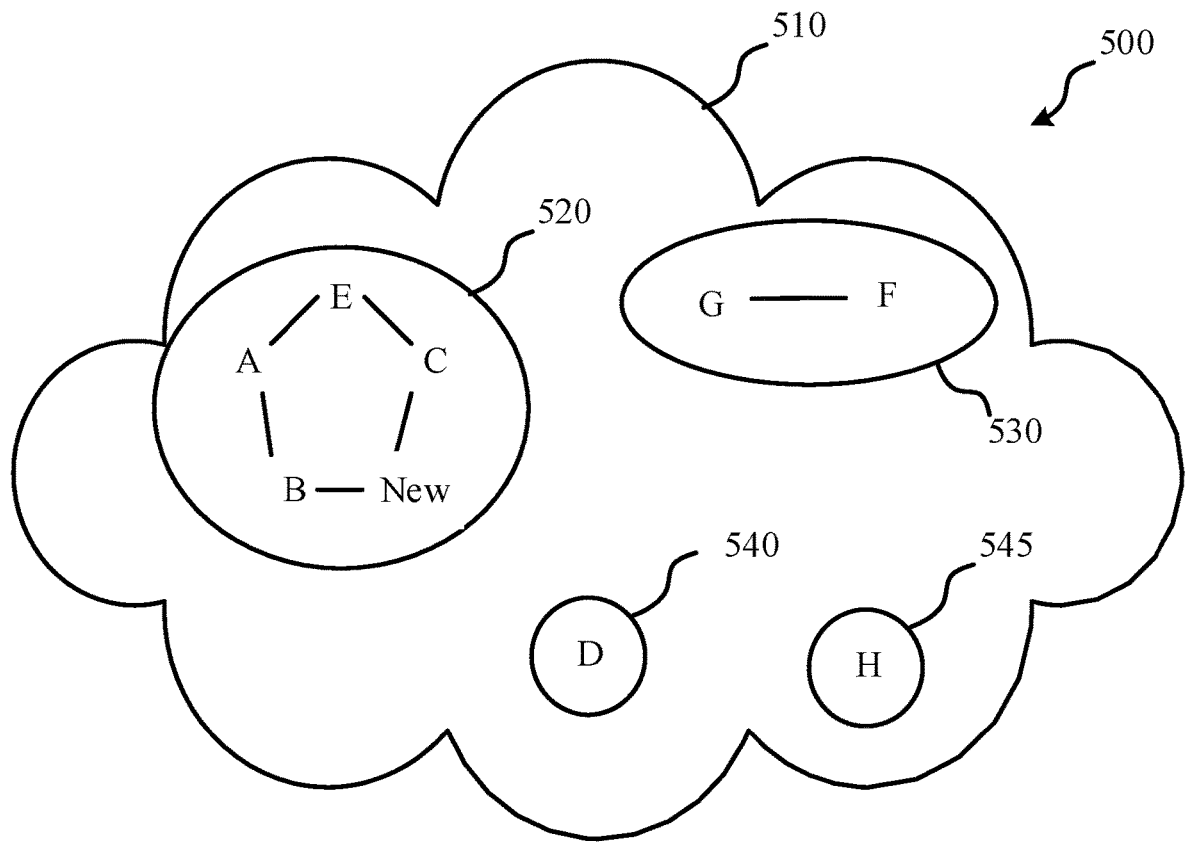
FIG. 5A depicts a schematic diagram of a self-organized centerless network with a new node added to the network, according to some embodiments.
Figure 5B:
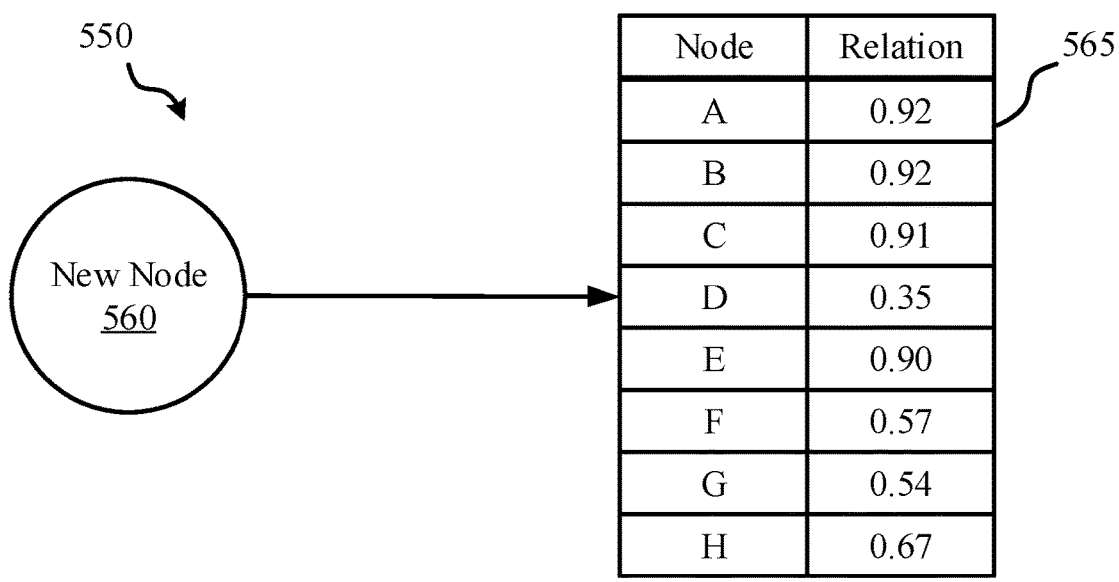
FIG. 5B depicts a schematic diagram of a node relationship map for the new node, according to some embodiments.

Referring to FIG. 5A, a schematic diagram of a self-organized centerless network environment 500 with a new node added to the network is depicted, according to some embodiments. Self-organized centerless network environment 500 may include self-organized centerless network 510. In some instances, self-organized centerless network 510 may be an adjusted self-organized centerless network from self-organized centerless network 310 (FIG. 3) after a new node has been added to the security network (for example, by gaining access to the cloud database). With a new node added to self-organized centerless network 510, the new node is in a group 520 with nodes A, B, C, and E. Compared to self-organized centerless network 310 (FIG. 3), the new node may have replaced node H in group 520 (compared to group 320 (FIG. 3)). The new node may have replaced node H in group 520 because the new node may have a closer relation to nodes A, B, C, and E than node H, for instance. In self-organized centerless network 510, node H may not have a close enough relation to any other node in the security network (for example, because it may not meet a relationship threshold), so node H is in an individual group 545. Node D may remain in an individual group 540 (corresponding to group 340 (FIG. 3)) and nodes G and F may remain in a group 530 (corresponding to group 330 (FIG. 3)).

Referring to FIG. 5B, a schematic diagram of an example node relationship map 550 for the new node 560 is depicted, according to some embodiments. In some instances, node relationship map 550 may be used to determine a federated security model (for example, in operation 155 (FIG. 1)) for the new node 560. The relationships between new node 560 and the other nodes in the self-organized centerless network 510 are depicted in chart 565. New node 560 has a relation of 0.92 to node A, 0.92 to node B, 0.91 to node C, 0.35 to node D, 0.90 to node E, 0.57 to node F, 0.54 to node G, and 0.67 to node H. In some instances, the relationship threshold may be 0.90, and nodes A, B, C, and E may all exceed the relationship threshold, therefore forming group 520.

Figure 6:
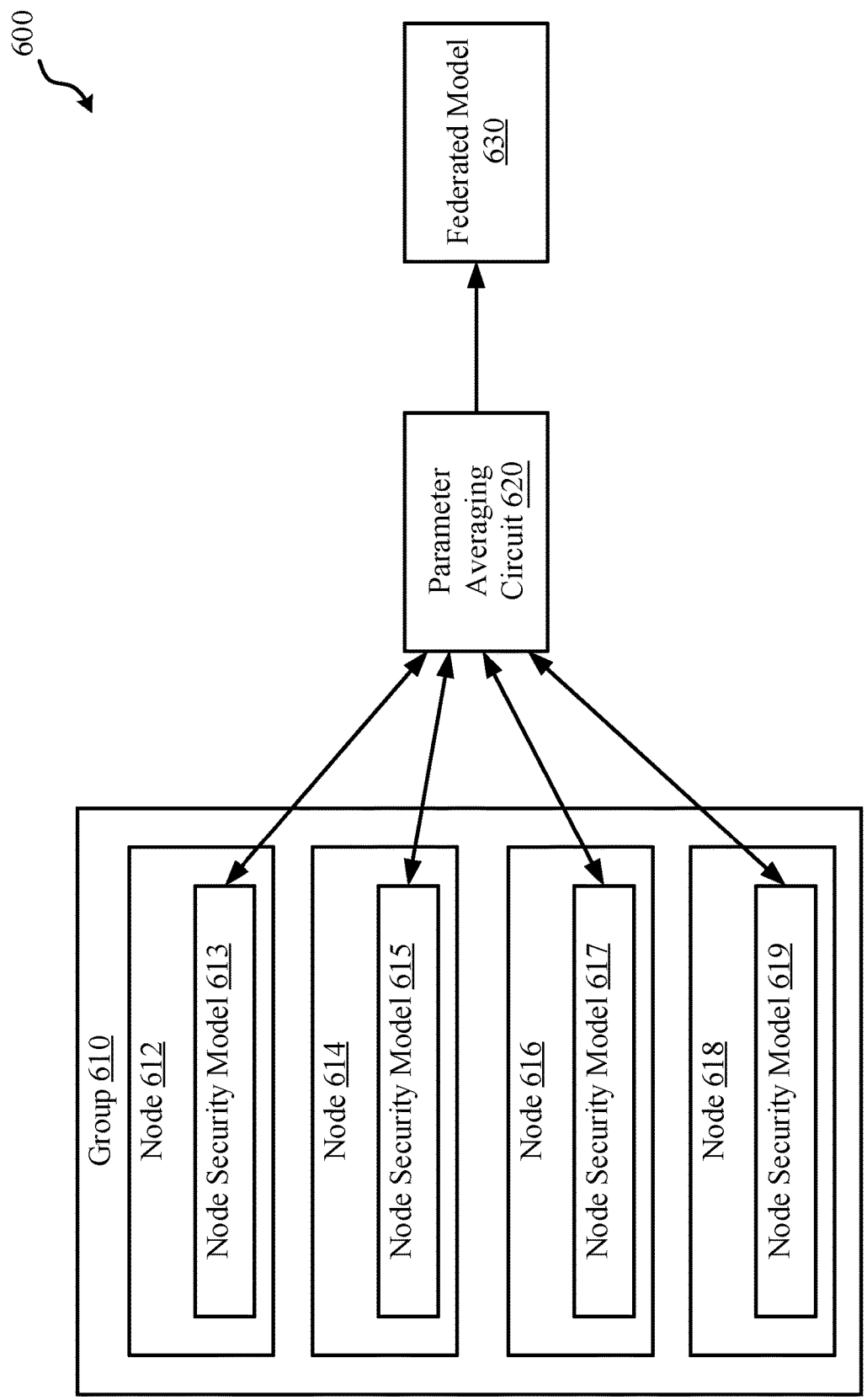
FIG. 6 depicts a block diagram of a parameter averaging environment, according to some embodiments.

Referring to FIG. 6, a block diagram of a parameter averaging environment 600 is depicted, according to some embodiments. The parameter averaging environment 600 includes group 610 from a self-organized centerless network (e.g., self-organized centerless network 310 (FIG. 3) and/or 510 (FIG. 5)). Group 610 includes node 612, node 614, node 616, and node 618. Each node (612, 614, 616, and 618) has a node security model (613, 615, 617, and 619, respectively). In some instances, node security models 613, 615, 617, and 619 may be generated as discussed herein. The node security models 613, 615, 617, and 619 are inputted into parameter averaging module 620. In some instances not depicted in FIG. 6, each node (612, 614, 616, and 618) in the self-organized centerless network has a parameter averaging circuit 620.

In some instances (not depicted in FIG. 6), parameter averaging circuit 620 may perform various operations (for example, making up a parameter averaging technique) to achieve parameter averaging on the security models (613, 615, 617, and 619). For instance, parameter averaging circuit 620 may identify neural network parameters for each model (613, 615, 617, and 619) based on the configuration of each model (613, 615, 617, and 619). In some instances, the neural network parameters for each model (613, 615, 617, and 619) may be distributed to each parameter averaging circuit 620 on each node (612, 614, 616, and 618) within the self-organized centerless network, and each parameter averaging circuit 620 may perform its own training and parameter averaging using the neural network parameters. Each parameter averaging circuit 620 may average the neural network parameters for each node (613, 615, 617, and 619), resulting in a single average set of parameters. However, each of the nodes (612, 614, 616, and 618) may have different data (as each node is different), therefore the average set of parameters calculated on each parameter averaging circuit 620 may be slightly different. Therefore, the average set of parameters may be exchanged between each node (612, 614, 616, and 618) of the self-organized centerless network, and a global set of parameters may be formed based on the average set of parameters from each node (612, 614, 616, and 618). The global set of parameters may be universal across all the nodes (612, 614, 616, and 618) of the self-organized centerless network, in some instances. The parameter averaging circuit 620 forms the federated model 630 from the global set of parameters. Federated model 630 is outputted from the parameter averaging circuit 620.

Figure 7:
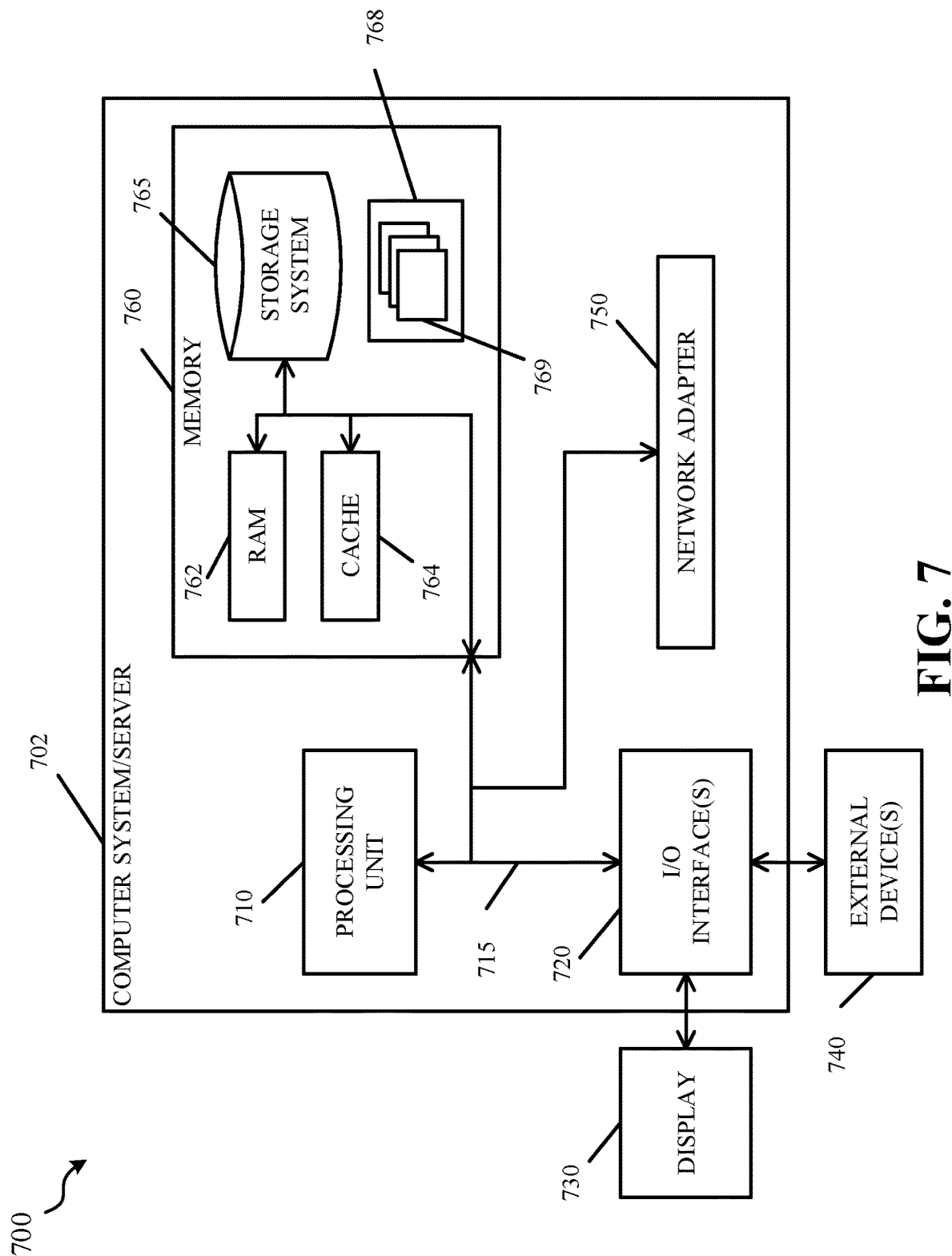
FIG. 7 depicts a block diagram of an example computer system environment, according to some embodiments.

Referring to FIG. 7, computer system 700 is a computer system/server 702 is shown in the form of a general-purpose computing device, according to some embodiments. In some embodiments, computer system/server 702 is located on the linking device. In some embodiments, computer system 702 is connected to the linking device. The components of computer system/server 702 may include, but are not limited to, one or more processors or processing units 710, a system memory 760, and a bus 715 that couples various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random-access memory (RAM) 762 and/or cache memory 764. Computer system/server 702 may further include other removable/non-removable, volatile/non-volatile computer system storage media. By way of example only, storage system 765 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the disclosure.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more external devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
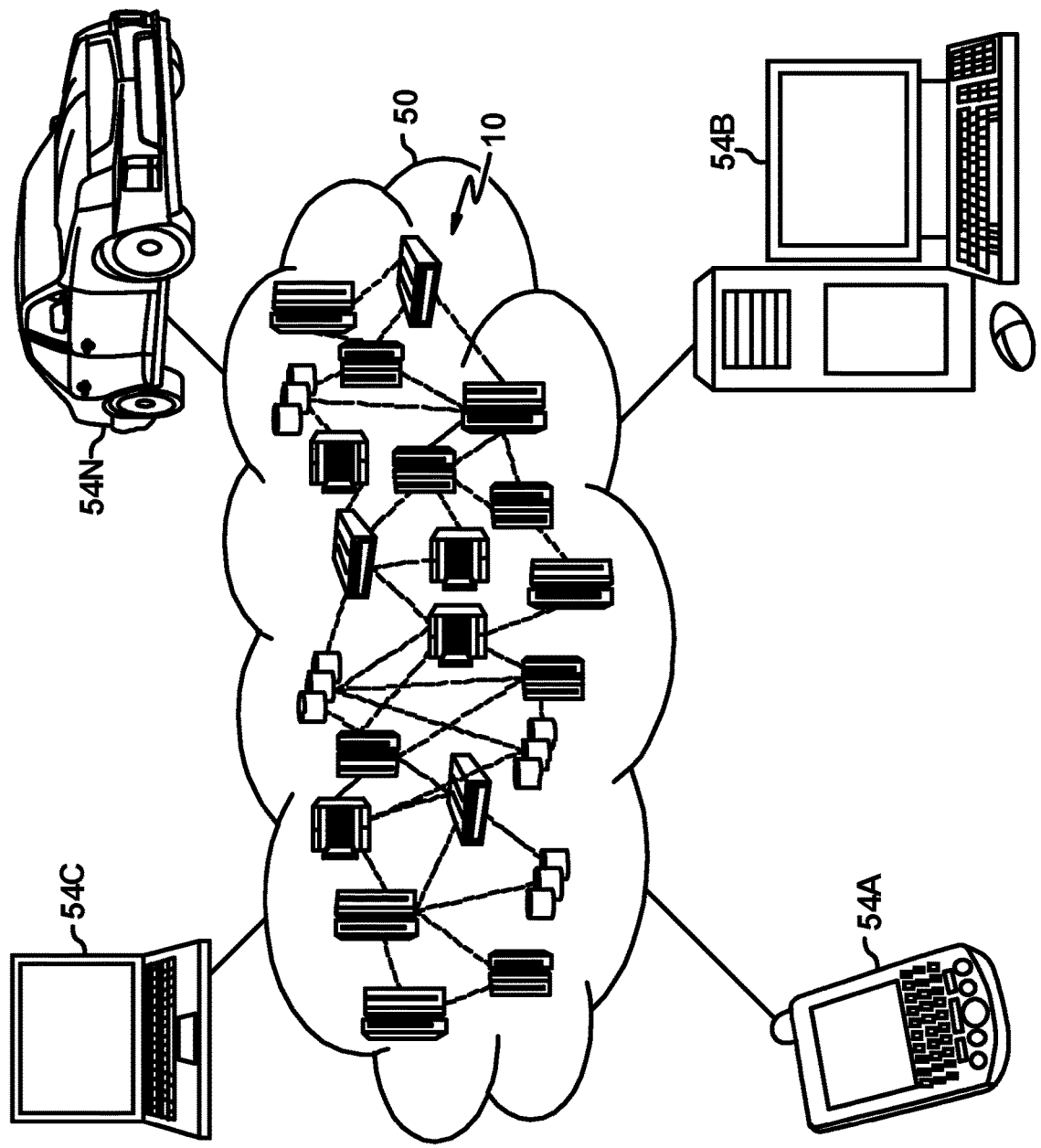
FIG. 8 depicts a cloud computing environment, according to some embodiments.

Referring now to FIG. 8, illustrative cloud computing environment 50 is depicted, according to some embodiments. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
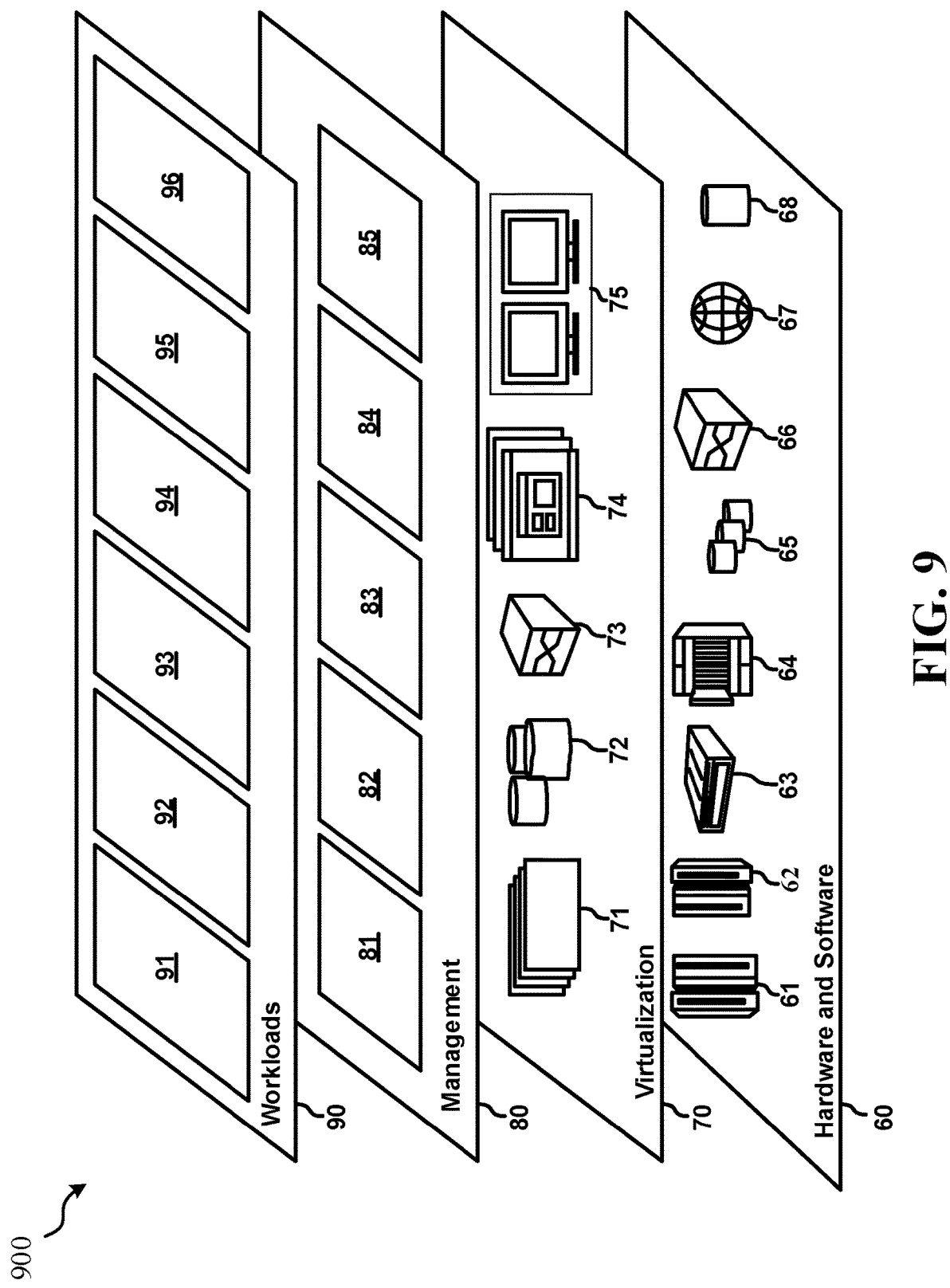
FIG. 9 depicts abstraction model layers, according to some embodiments.

Referring now to FIG. 9, a set of functional abstraction layers 900 provided by cloud computing environment 50 (FIG. 8) is shown, according to some embodiments. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database security 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to some embodiments of the present invention. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
identifying a plurality of nodes connected to a security network;
analyzing security characteristics of each node of the plurality of nodes, wherein the security characteristics comprise at least one of data regarding security policies and data regarding security server layers;
identifying, from the security characteristics, key factors for each node;
calculating similarities between each node of the plurality of nodes using the key factors;
building a self-organized centerless network across the plurality of nodes by grouping nodes based on the similarities between each node, resulting in groups of nodes; and
generating federated security models for the groups of nodes.

2. The method of claim 1, further comprising:
determining that a new node is added to the security network;

calculating similarities between the new node and each of the plurality of nodes;
selecting nodes from the plurality of nodes with a close relationship to the new node, resulting in selected nodes;
generating a second federated security model for the new node based on the selected nodes; and
deploying the second federated security model on the new node.

3. The method of claim 2, wherein generating the second federated security model for the new node comprises:
identifying a federated security model from the federated security models that corresponds to a highest amount of nodes from the selected nodes, resulting in a best match security model; and
selecting the best match security model as the second federated security model.

4. The method of claim 2, wherein generating the second federated security model for the new node comprises:
analyzing the federated security models that correspond to the selected nodes; and
synthesizing the federated security models that correspond to the selected nodes, resulting in a synthesized security model for the group of nodes, wherein the synthesized security model is the federated security model.

5. The method of claim 4, wherein synthesizing the federated security models that correspond to the selected nodes comprises:
identifying one or more parameters used in the federated security models;
determining a set of parameters for the second federated security model based on the one or more parameters; and
generating the second federated security model from the set of parameters for the second federated security model.

6. The method of claim 5, wherein determining the set of parameters for the second federated security model comprises:
performing parameter averaging techniques on the federated security models that correspond to the selected nodes, resulting in the set of parameters for the second federated security model.

7. The method of claim 1, wherein building the self-organized centerless network across the plurality of nodes comprises:
generating a node relationship map for the plurality of nodes; and
grouping the nodes with high similarities based on the node relationship map, resulting in the groups of nodes.

8. The method of claim 7, wherein grouping nodes the nodes with high similarities comprises:
generating a closest neighbors list for each node from the plurality of nodes using the node relationship map;
determining a relationship threshold based on the node relationship map and the closest neighbors list;
comparing each node relationship to the relationship threshold; and
forming groups of nodes comprising nodes with relationships above the relationship threshold.

9. The method of claim 1, wherein generating the federated security models for the groups of nodes comprises:
generating a federated security model for each group of nodes from the groups of nodes, wherein generating the federated security model comprises:
identifying a machine learning model for the security network, wherein the machine learning model was built and trained using historical data;
generating a node security model for each node of the group of nodes, wherein the node security model comprises an architectural model;
performing parameter averaging techniques on each node security model, resulting in a set of parameters for the group of nodes; and
generating the federated security model from the set of parameters.

10. The method of claim 9, wherein generating the node security model comprises:
selecting a node from the group of nodes;
inputting the key factors for the node into the machine learning model; and
outputting the architectural model for the node including at least a deployment layer structure for the node.

11. The method of claim 1, wherein each group of nodes from the groups of nodes comprises nodes with strong relationships between each node in the group of nodes.

12. A system having one or more computer processors, the system configured to:
identify a plurality of nodes connected to a security network;
analyze security characteristics of each node of the plurality of nodes;
identify, from the security characteristics, key factors for each node;
calculate similarities between each node of the plurality of nodes using the key factors;
build a self-organized centerless network across the plurality of nodes by grouping nodes based on the similarities between each node, resulting in groups of nodes; and
generate federated security models for the groups of nodes.

13. The system of claim 12, the system further configured to:
determine that a new node is added to the security network;
calculate similarities between the new node and each of the plurality of nodes;
select nodes from the plurality of nodes with a close relationship to the new node, resulting in selected nodes;
generate a second federated security model for the new node based on the selected nodes; and
deploy the second federated security model on the new node.

14. The system of claim 12, wherein building the self-organized centerless network across the plurality of nodes comprises:
generating a node relationship map for the plurality of nodes; and
grouping the nodes with high similarities based on the node relationship map, resulting in the groups of nodes.

15. The system of claim 14, wherein grouping nodes the nodes with high similarities comprises:
generating a closest neighbors list for each node from the plurality of nodes using the node relationship map;
determining a relationship threshold based on the node relationship map and the closest neighbors list;
comparing each node relationship to the relationship threshold; and forming groups of nodes comprising nodes with relationships above the relationship threshold.

16. The system of claim 12, wherein generating the federated security models for the groups of nodes comprises:
generating a federated security model for each group of nodes from the groups of nodes, wherein generating the federated security model comprises:
identifying a machine learning model for the security network, wherein the machine learning model was built and trained using historical data;
generating a node security model for each node of the group of nodes, wherein the node security model comprises an architectural model;
performing parameter averaging techniques on each node security model, resulting in a set of parameters for the group of nodes; and
generating the federated security model from the set of parameters.

17. A computer program product comprising a computer readable storage medium having program instructions embodied therewith, the program instructions executable by a server to cause the server to perform a method, the method comprising:
identifying a plurality of nodes connected to a security network;
analyzing security characteristics of each node of the plurality of nodes;
identifying, from the security characteristics, key factors for each node;
calculating similarities between each node of the plurality of nodes using the key factors;
building a self-organized centerless network across the plurality of nodes by grouping nodes based on the similarities between each node, resulting in groups of nodes; and
generating federated security models for the groups of nodes.

18. The computer program product of claim 17, further comprising:
determining that a new node is added to the security network;
calculating similarities between the new node and each of the plurality of nodes;
selecting nodes from the plurality of nodes with a close relationship to the new node, resulting in selected nodes;
generating a second federated security model for the new node based on the selected nodes; and
deploying the second federated security model on the new node.

19. The computer program product of claim 17, wherein building the self-organized centerless network across the plurality of nodes comprises:
generating a node relationship map for the plurality of nodes; and
grouping the nodes with high similarities based on the node relationship map, resulting in the groups of nodes.

20. The computer program product of claim 17, wherein generating the federated security models for the groups of nodes comprises:
generating a federated security model for each group of nodes from the groups of nodes, wherein generating the federated security model comprises:
identifying a machine learning model for the security network, wherein the machine learning model was built and trained using historical data;
generating a node security model for each node of the group of nodes, wherein the node security model comprises an architectural model;
performing parameter averaging techniques on each node security model, resulting in a set of parameters for the group of nodes; and
generating the federated security model from the set of parameters.

\* \* \* \* \*